United States Patent [19]
Tayloe

[11] Patent Number: 6,112,087
[45] Date of Patent: Aug. 29, 2000

[54] METHOD AND APPARATUS FOR USER-AIDED REGISTRATION

[75] Inventor: Daniel Richard Tayloe, Phoenix, Ariz.

[73] Assignee: Motorola, Inc., Schaumburg, Ill.

[21] Appl. No.: 09/128,430

[22] Filed: Aug. 4, 1998

[51] Int. Cl.[7] .................................................. H04Q 7/20
[52] U.S. Cl. ........................ 455/435; 455/456; 455/457; 455/427
[58] Field of Search .................................. 455/435, 436, 455/437, 438, 439, 440, 456, 457, 427, 428, 429, 430

[56] References Cited

U.S. PATENT DOCUMENTS

| | | | |
|---|---|---|---|
| 5,222,248 | 6/1993 | McDonald et al. ..................... | 455/33.2 |
| 5,528,247 | 6/1996 | Nonami .................................. | 455/12.1 |
| 5,561,836 | 10/1996 | Sowles et al. ......................... | 455/12.1 |
| 5,579,535 | 11/1996 | Orlen et al. ............................ | 455/33.1 |
| 5,592,154 | 1/1997 | Lin et al. ............................... | 340/825.5 |
| 5,946,618 | 8/1999 | Agre et al. ............................. | 455/428 |
| 6,006,091 | 12/1999 | Lupien .................................... | 455/435 |
| 6,035,195 | 3/2000 | Kishida et al. ......................... | 455/435 |

*Primary Examiner*—Dwayne D. Bost
*Assistant Examiner*—Raymond Persino
*Attorney, Agent, or Firm*—Sherry J. Whitney; James E. Klekotka

[57] ABSTRACT

At least one ground station (120) and at least one subscriber unit (SU) (130) allow users to perform user-aided registration procedures in satellite communications system (100). Ground station (120) and SU (130) communicate with each other using at least one communications satellite (110). The user-aided registration procedures (400, 500, and 600) enable border crossings to more accurately be processed by the system (100). Registration region information is presented to a user using a display device. A user response is processed by the SU and the ground station during registration procedures.

17 Claims, 4 Drawing Sheets

METHOD AND APPARATUS FOR USER-AIDED REGISTRATION

FIELD OF THE INVENTION

The present invention relates generally to satellite communication systems and, more particularly, to a method and apparatus for user-aided registration.

BACKGROUND OF THE INVENTION

Subscribers use various devices (e.g., a cellular telephone or pager) to communicate with other subscribers within a satellite communications system. These devices communicate with the system via several communications processes, each involving an exchange of messages between the subscriber and the system.

Registration, for example, is one of these communication processes. Each registration process involves an exchange of registration messages between the subscriber and the system. Registration may also be used to keep track of the subscriber so that the system knows where to send messages that indicate an incoming call for that subscriber.

When a subscriber crosses a border between two countries, a satellite communications system may have to detect this border crossing for a number of reasons. In some cases, the user is forced to re-register. Forced re-registration can occur for a variety of reasons.

In some existing satellite communications systems, provisions have been made to automatically re-register subscriber units that move between different areas which are controlled by different gateways. In addition, some existing satellite communications systems use re-registration procedures and protocols based on geo-location information.

What are needed are a method and apparatus for allowing user-aided registration in a satellite communications system. Further needed are a method and apparatus which allow a user to receive a visual indication of the registration region and which allow the user to force re-registration to occur in a particular region.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DETAILED DESCRIPTION OF A PREFERRED EMBODIMENT

The method and apparatus of the present invention, among other things, allow user-aided registration in a satellite communications system. Further, the method and apparatus of the present invention allow a user to receive a visual indication of the registration region and allow the user to force re-registration to occur in a particular region.

As used herein, the terms "cell", "beam", and "registration region" are not intended to be limited to any particular mode of generation and include those created by either terrestrial or satellite cellular communications systems and/or combinations thereof. The present invention is applicable to terrestrial-based and space-based communication systems. Systems may include satellites having low-earth, medium-earth and geo-synchronous orbits.

Figure 1:
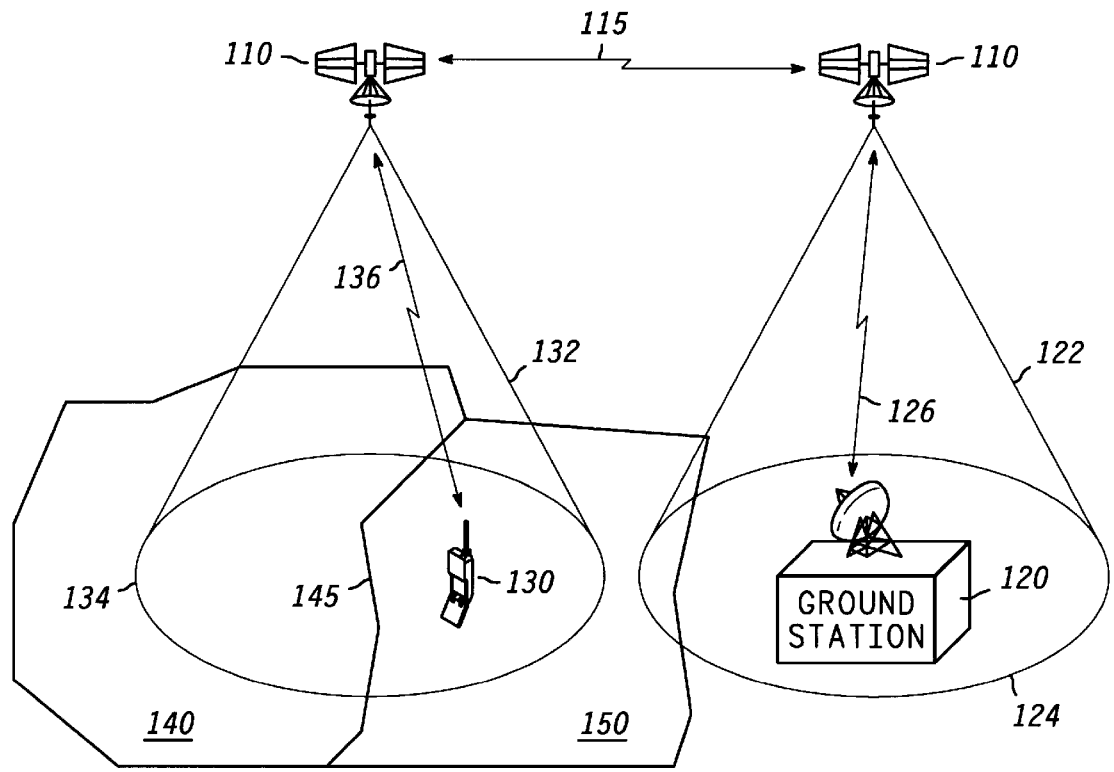
FIG. 1 illustrates a highly simplified diagram of a satellite communications system in accordance with a preferred embodiment of the present invention.

FIG. 1 illustrates a highly simplified diagram of a satellite communications system in accordance with a preferred embodiment of the present invention. In a preferred embodiment, satellite communications system 100 comprises a number of communications satellites 110, at least one ground station 120, and at least one subscriber unit (SU) 130.

For clarity, FIG. 1 illustrates only two communications satellites 110, a single ground station 120, and a single SU 130. This is done to facilitate the explanation of the invention. Different numbers of communications satellites, ground stations, and SUs can be used. While the present invention is advantageously employed when a large number of satellites are being used, it is also applicable with as few as a single satellite.

In a preferred embodiment, communications satellites 110 communicate with other communications satellites 110 using crosslinks 115. In FIG. 1, a single crosslink is illustrated. This is done to facilitate the explanation of the invention. In a preferred embodiment, a number of communications satellites and crosslinks are used. In alternate embodiments, various numbers of communications satellites and crosslinks can be used. In alternate embodiments, communications satellites 110 can communicate with each other using bent pipe links.

Communications satellites 110 communicate with ground stations 120 using communication links 126. Communications satellites 110 communicate with SUs 130 using communication links 136. In alternate embodiments, communications satellites 110 can communicate with ground stations 120 and SUs 130 using bent pipe links.

Generally, communications system 100 can be viewed as a network of nodes. For example, communications satellites 110, ground stations 120, and SUs 130 can be viewed as nodes in communications system 100. All nodes of communications system 100 are or can be in data communication with other nodes of communications system 100 through communication links such as those illustrated by links 115, 126, and 136. In addition, all nodes of communications system 100 are or can be in data communication with other devices dispersed throughout the world through satellite or terrestrial networks coupled to communications system 100 through ground stations and subscriber units.

Desirably, communications satellites 110 include array antennas (not shown). Each array antenna transmits numerous discrete antenna beams, as illustrated by 122 and 132. Beams 122 and 132 project cells on the surface of the earth, such as those illustrated by cells 124 and 134. The pattern of cells which satellite 110 projects on the surface of the earth is referred to as a footprint. Overlap areas can be created at the cellular level, and overlap areas can be used for hand-offs.

The invention is applicable to communications satellites 110 that use single or multiple beams pointed towards the earth, and preferably, to satellites that move cells across the surface of the earth along a deterministic ground track. The invention is also applicable to systems where full coverage of the earth is not achieved.

The invention is applicable to SUs that move with respect to geo-political regions and their associated common borders. The invention is applicable to SUs that move with respect to registration regions and their associated common borders. The invention is also applicable to communications system in which registration regions change with respect to time.

In a preferred embodiment, at least one communications channel is provided between ground station 120 and SU 130 using link 126, link 115, and link 136. These communications channels are used to exchange messages between ground station 120 and SU 130 during a user-aided registration procedures. In FIG. 1, links 115, 126, and 136 are illustrated as bi-directional links. This is not required for the invention. In alternate embodiments, links 115, 126, and 136 can be unidirectional links.

In a preferred embodiment, links 115, 126, and 136 encompass a limited portion of the electromagnetic spectrum that is divided into channels. Links 115, 126, and 136 can encompass any suitable channel diversity scheme such as Frequency Division Multiple Access (FDMA) and/or Time Division Multiple Access (TDMA) and/or Code Division Multiple Access (CDMA) communications channels or combinations thereof.

In a preferred embodiment, at least one ground station 120 in system 100 has been adapted to perform user-aided registration procedures, as described below. For example, ground station 120 can be a system control center or be connected to one or more system control centers. In addition, ground station 120 can also be a gateway (GW) or be connected to one or more gateways, which provide access to at least one terrestrial-based communications network, such as the public switched telephone network (PSTN) or other communications facilities (not shown in FIG. 1). In alternate embodiments, ground stations 120 can be mobile and fixed communications devices, which transmit data to and receive data from satellites 110.

In a preferred embodiment, at least one ground station 120 is responsible for maintaining data records for SUs 130. For example, data records can include location information, subscriber information, and registration information. Subscriber information can include, among other things, subscriber priority levels and current level of service. Location information can include, among other things, geo-location information and geo-political boundary information. Registration information can include, among other things, display information that is used to inform the user of the current registration region, allowable registration regions, current location, rates, and status.

In a preferred embodiment, at least one SU 130 in system 100 has been adapted to perform user-aided registration procedures, as described below. SUs 130 are preferably communications devices, which receive data from and transmit data to communications satellites 110. By way of example, SUs 130 can be cellular telephones or two-way paging devices adapted to communicate with communications satellites 110. SUs 130 include, among other things, means for presenting messages and means for receiving user inputs in response to the presentation of message information. SUs 130 can be located anywhere on the surface of the earth or in the atmosphere above the earth.

FIG. 1 also shows first region 140, second region 150, and common border 145. In a preferred embodiment, first region 140 represents a first registration region, and second region 150 represents a second registration region. Registration regions are established within a communications system for geo-political and economic reasons. Desirably, common borders 145 between registration regions can be identified by users or identified for users. For example, first region 140 could be the United States, and second region 150 could be Mexico. In this case, common border 145 could be the border between Mexico and the United States, and a SU user registers or re-registers with a communications system when he crosses a border between two countries.

In a preferred embodiment, different geo-political regions can have different procedures that can effect how often a SU registers with the system. For example, different countries can have different rules for handling a SU that initiates a call within their borders, for handling a SU that receives a call within their borders, and for allowing a SU to continue a call that was initiated outside their borders. In a preferred embodiment, ground stations 120 store these rules. In alternate embodiments, SUs 130 can store some of these rules.

In a preferred embodiment, a border, such as illustrated by common border 145, is irregular, and irregular borders cause problems for many position determining systems. For example, even if a position determining system has accurate knowledge of a SU's location, it is possible to place the SU in the wrong country since there are generally storage limitations which restrict the granularity of border data.

In a preferred embodiment, user knowledge is used to determine when common borders 145 are approached and/or crossed. In addition, user knowledge is used to add resolution to border data. User-aided registration procedures allow users, among other things, to overcome border resolution limitations inherent in some systems. For example, a user can identify common borders 145 using knowledge of customs inspection terminals and border crossing gates.

In alternate embodiments, local and regional maps can be presented to a user to help determine common borders 145. In addition, registration regions can be presented to a user. For example, presenting multiple levels of maps and registration regions to a user can add resolution.

Figure 2:
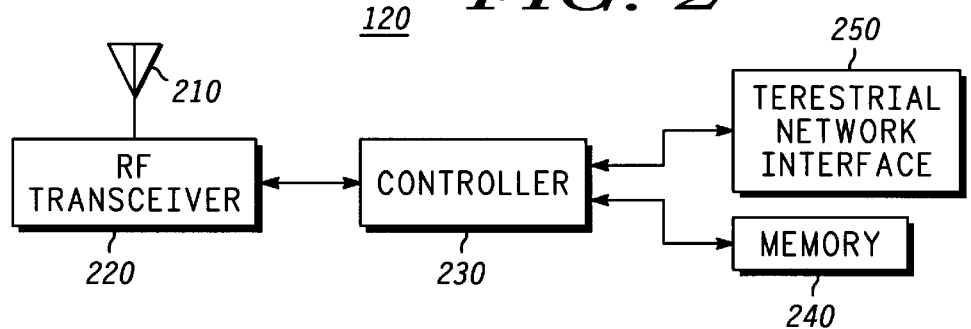
FIG. 2 shows a simplified block diagram of a ground station adapted to perform user-aided registration procedures in accordance with a preferred embodiment of the present invention.

FIG. 2 shows a simplified block diagram of a ground station adapted to perform user-aided registration procedures in accordance with a preferred embodiment of the present invention. Ground station 120 comprises antenna 210, radio frequency (RF) transceiver 220, controller 230, memory 240, and terrestrial network interface 250. Alternate embodiments can be envisioned that do not include terrestrial network interface 250. Alternate embodiments can also be envisioned that include antenna 210 with RF transceiver 220.

Antenna 210 is coupled to RF transceiver 220. Antenna 210 is used to establish communications links, such as illustrated by link 126 (FIG. 1).

Transceiver 220, among other things, processes received signals into digital data. In addition, transceiver 220 processes digital data obtained from controller 230 into transmitted signals. Desirably, digital data includes message information that is sent to and received from at least one SU. In addition, RF transceiver 220 performs, among other things, procedures for time and frequency control, for modulation and demodulation control, and frequency conversion.

Controller 230 is coupled to transceiver 220. Controller 230 is used among other things, to process digital data received from transceiver 220 and to process other digital data for transmission by transceiver 220.

In a preferred embodiment, controller 230, processes message data from SUs 130 (FIG. 1) that request to register, determines which SUs can perform user-aided registration procedures, and processes messages that are exchanged between ground station 120 and SUs 130.

In addition, controller 230 processes location information for a SU during user-registration procedures. In a preferred embodiment, location information is sent by a SU to a ground station. In an alternate embodiment, controller 230 performs location-determining procedures using information from memory 240.

Memory 240 is coupled to controller 230. In a preferred embodiment, memory 240 is used to store instructions which controller 230 uses, among other things, to perform user-aided registration procedures as detailed below. Memory 240 can be a random access memory, read only memory, or any other type of storage medium and can be integral with or separate from controller 230.

Desirably, memory 240 is used, among other things, to store databases. At least one database contains records that are used to describe borders for a number of registration regions. Desirably, registration region border information is stored only for registration regions located close to a particular ground station. Another database is used to store an ASCII string for each registration region. In a preferred embodiment, the ASCII strings are used to identify the registration regions to a SU user. Registration regions can be sub-divided into smaller areas such as those identified using location area codes (LACs). In a preferred embodiment, a SU is associated with a LAC, and the SU's LAC is used to associate the SU with the correct ASCII identification string.

Registration regions can include a single country or other geo-political entity. In addition, large countries, such as China, can include one or more registration regions. Registration regions can also include a number of countries. For example, Finland, Norway, Sweden, and Denmark could be included in a Scandinavian Region. In other cases, a country can decide not to participate in a global communications system, and SUs within this country's borders would not be allowed to register with the system. Databases can be configured at a ground station to maintain more accurate border data for a non-participating country. This information can be sent to a SU during the user-aided registration procedure.

In alternate embodiments, user messages can also be stored and displayed in different languages for different SUs. In other alternate embodiments, current billing rates for the registration regions can also be stored by at least one ground station, and billing information can be sent to SUs during user-aided registration procedures.

In other embodiments, lists of allowed registration regions could also be stored by at least one ground station. In some embodiments, a list of allowable registration regions can be sent to a SU during a user-aided registration. In one alternate embodiment, a user can select a registration region from a list of registration regions presented on a display on the SU. In another embodiment, a user can designate a first choice and a second choice.

In other embodiments, dual-registration zones are stored. In these embodiments, borders are so irregular that they cannot be resolved with any certainty so a SU can be registered in either region and charges/payments are divided between the two regions using a previously established formula.

Desirably, controller 230 is also used to control the number of users that can initiate user-aided registrations during a particular amount of time. This is done to minimize any detrimental effects to the system. For example, controller 230 can re-schedule some tasks for a later time based on a SU's priority level. Messages can be sent that require a user to wait a certain amount of time before requesting to perform a user-aided registration.

Figure 3:
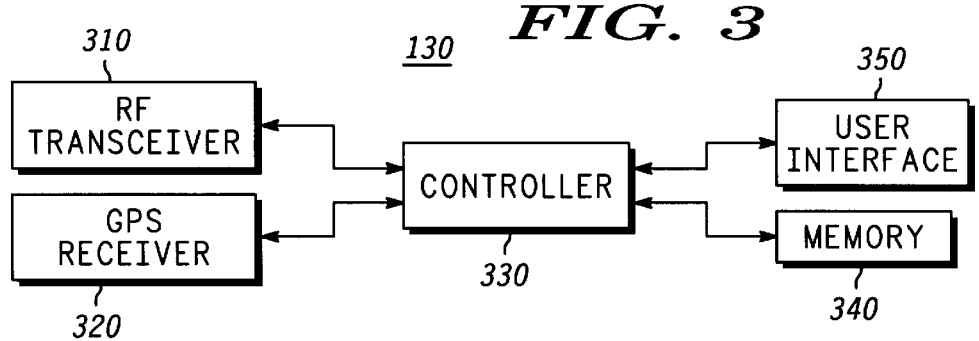
FIG. 3 illustrates a simplified block diagram of a subscriber unit adapted to perform user-aided registration procedures in accordance with a preferred embodiment of the present invention.

FIG. 3 illustrates a simplified block diagram of a subscriber unit adapted to perform user-aided registration procedures in accordance with a preferred embodiment of the present invention. SU 130 comprises RF transceiver 310, Global Positioning System (GPS) receiver 320, controller 330, memory 340, and user interface 350. RF transceiver 310 is used to transmit RF signals to and receive RF signals from a satellite. Transceiver 310 is coupled to controller 330 and to at least one antenna (not shown).

Transceiver 310, among other things, processes received signals into digital data. In addition, transceiver 310 processes digital data obtained from controller 330 into transmitted signals.

Controller 330 is coupled to transceiver 310. Controller 330 is used, among other things, to process digital data received from transceiver 310 and to process other digital data for transmission by transceiver 310.

Memory 340 is coupled to controller 330. Memory 340 stores data that serve as instructions to controller 330 and that, when executed by controller 330, cause SU 130 (FIG. 1) to carry out procedures which are discussed below. In addition, memory 340 includes display data, variables, and tables that are manipulated during the operation of SU 130.

GPS receiver 320 is coupled to controller 330 and to at least one antenna (not shown). In a preferred embodiment, GPS receiver 320 is used to geo-locate SU 130. GPS receiver 320 provides location information, among other things, to controller 330. SU 130 sends information concerning its location to at least one ground station.

User interface 350 is coupled to controller 330. User interface 350 comprises at least one display device for presenting messages. In a preferred embodiment, messages are presented during user-aided registration procedures as described below. In alternate embodiments, messages can also be presented at various other times during the operation of a SU. User interface 350 also comprises at least one input device that is used, among other things, to receive user input in response to presented messages. In alternate embodiments, user-aided registrations can be manually initiated by cycling the power off and on.

In alternate embodiments, a list of allowable registration regions can be stored in a SU, and a pointer can be sent by a ground station during a user-aided registration procedure which is used to select one entry in the list to display. The list is loaded into a SU when the SU is activated. For example, a user could want a SU to operate in one or two registration regions and pay for that level of service.

Controller 330, among other things, controls and manages user interfaces, message reception and transmission, channel set-up, radio tuning, frequency and time slot assignment, and other subscriber unit communication and control functions. Desirably, controller 330 carries out procedures exemplified below and described in the associated text. For example, in addition to performing other tasks as appropriate, controller 330 desirably stores results from such procedures in memory 340.

Registration information can be entered, for example, by entering digits into a keypad or by inserting a magnetically coded card. Alternatively, the user device can determine the necessity to register autonomously from the subscriber. In a preferred embodiment, a Subscriber Information Module (SIM) identifies a subscriber. In alternate embodiments, priority levels and preferences can be stored in a SIM, in a SU, and in at least one ground station.

In a preferred embodiment, priority levels are determined for the SUs and can be displayed to the user. Priority levels are established based on system information and subscriber information. For example, priority levels can be established based on geo-political boundaries, rate change boundaries, and geo-physical boundaries. Low priority levels can restrict when a user is allowed to perform a user-aided registration.

Figure 4:
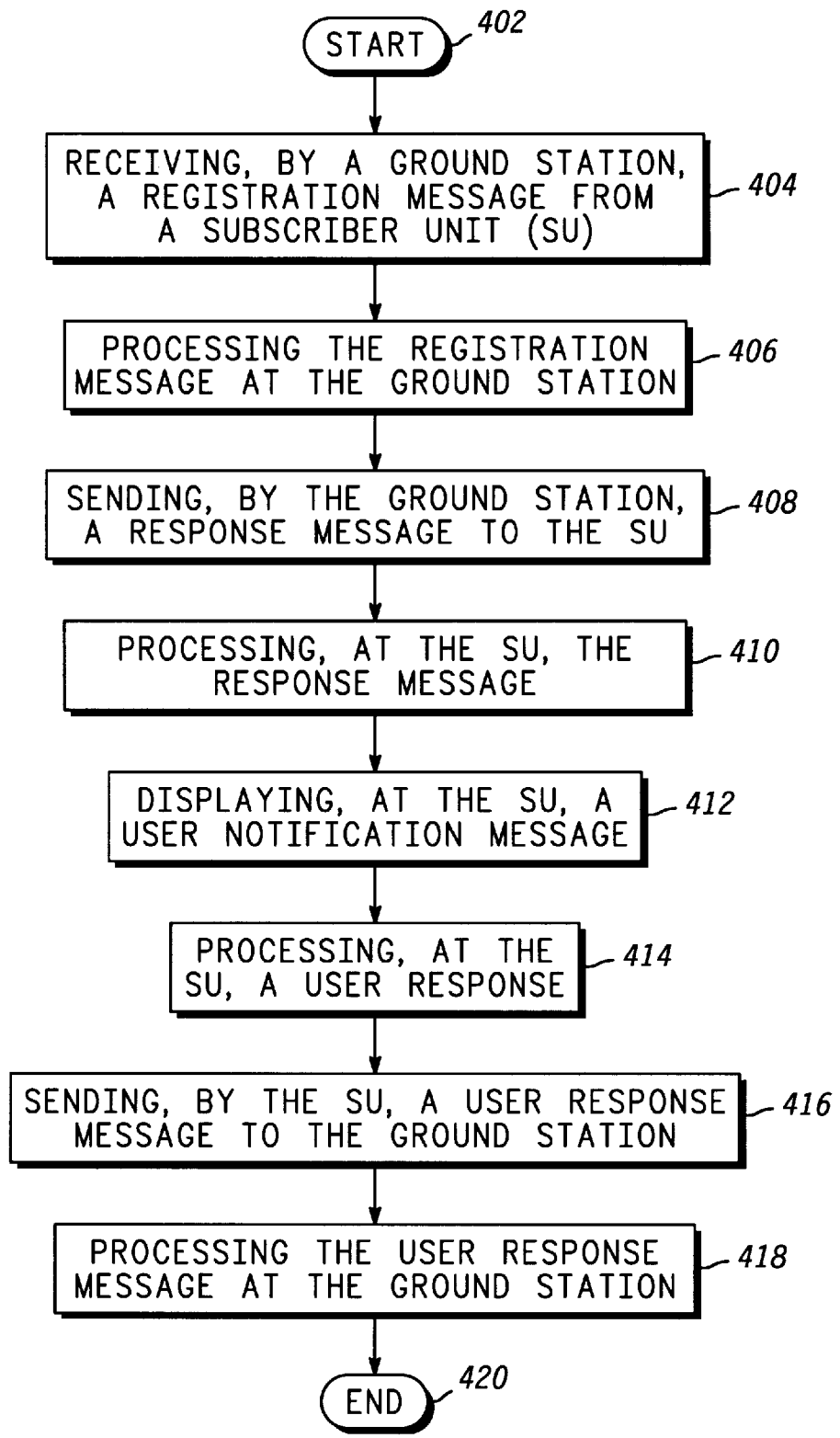
FIG. 4 illustrates a flowchart of a method for providing user-aided registration for a subscriber unit in a satellite communications system in accordance with a preferred embodiment of the present invention.

FIG. 4 illustrates a flowchart of a method for providing user-aided registration for a SU in a satellite communications system in accordance with a preferred embodiment of the present invention. Current and accurate registration information is important in a satellite communications system. For example, if a SU is in a region that is different from the SU's registration region, then a message to that SU may be incorrectly routed. Procedure 400 begins in step 402.

In step 404, a ground station receives a registration message from a SU. SUs can send registration messages for a variety of reasons including a request to register. A registration request can be sent when a SU is turned on. A registration request can be sent by a SU when its location changes and when a re-registration distance is exceeded. Typically, a registration request is sent by a SU when a user chooses to initiate a user-aided registration. Desirably, a user requests a user-aided registration when he/she crosses a geo-political boundary.

In step 406, the ground station processes the registration message from the SU. Desirably, when the registration message is a registration request, the ground station determines the location for the SU from the registration request.

Location information is important in a satellite communications system for a number of reasons. For example, a satellite communications system can use current location information to determine if a SU has the right to perform a user-aided registration from that location. In addition, the system can use the current location information to determine billing rates for user-aided registrations. Also, location information is important to determine revenue payments to service providers for a particular SU.

In a preferred embodiment, the ground station associates the SU's current location with a location area and associates a LAC to the SU based on the SU's current location. Desirably, the ground station has, among other things, a database that associates an ASCII string with each LAC. The ground station creates a registration response message, which comprises the ASCII string associated with the LAC in which the SU is currently located. The ASCII string is a phrase that a user can use to determine the registration region in which registration is going to occur.

In step 408, the ground station sends the response message to the SU. Desirably, the message comprises the ASCII string associated with the LAC in which the SU is currently located. In alternate embodiments, the response message can include a list (table) or a pointer to a position within a list (table).

In step 410, the SU processes the response message. Desirably, the SU extracts the ASCII string from the response message. In alternate embodiments, the SU can extract a list (table) or a pointer to a position within a list (table) from the response message.

In step 412, the SU displays the ASCII string using the display on the SU. In alternate embodiments, the SU can display a list (table). In other embodiments, the SU can display a string obtained using a pointer to a position within a list (table). For example, a SU can store lists of display messages, and the SU can use a pointer to determine which message to display. In some embodiments, an audio message is also presented to the user.

In step 414, the SU waits for a response from the user. Desirably, the user responds to the ASCII string message within a first amount of time.

In a preferred embodiment, when the user responds in the first amount of time, the SU processes a user response. Desirably, an ASCII string has been presented to the user that provides the user with an indication of the region in which registration is going to occur. The user can either accept or refuse to be registered in the region identified by the ASCII string. The user's decision is included in the user response.

In alternate embodiments, a user can select a registration region from a list. Desirably, the selection is sent as a part of the user response.

In a preferred embodiment, when the user does not respond in the first amount of time the SU ends procedure 400. In addition, when the user does not respond in the first amount of time, the ground station proceeds with the registration. In an alternate embodiment, the ground station does not proceed with the registration until an acknowledgement is received from the SU.

In step 416, the SU sends a user response message to the ground station. The user response message is used to inform the ground station about the user's decision.

In step 418, the ground station processes the user response message. Desirably, the user response message informs the ground station that the user as accepted being registered in the identified region, and procedure 400 ends in step 420.

In alternate embodiments, steps 408–418 can be repeated a number of times during a user-aided registration procedure. Steps 408–418 can be repeated when the user response message indicates that the user does not accept being registered in a first identified region. For example, in step 408, the ground station could send another registration response message to the SU.

In addition, steps 408–418 can be repeated when the user response message indicates that the user has selected a registration region from a list of registrations regions. This allows a user to force registration to take place in a particular region, and it allows a user to not allow registration to take in a particular region.

Figure 5:
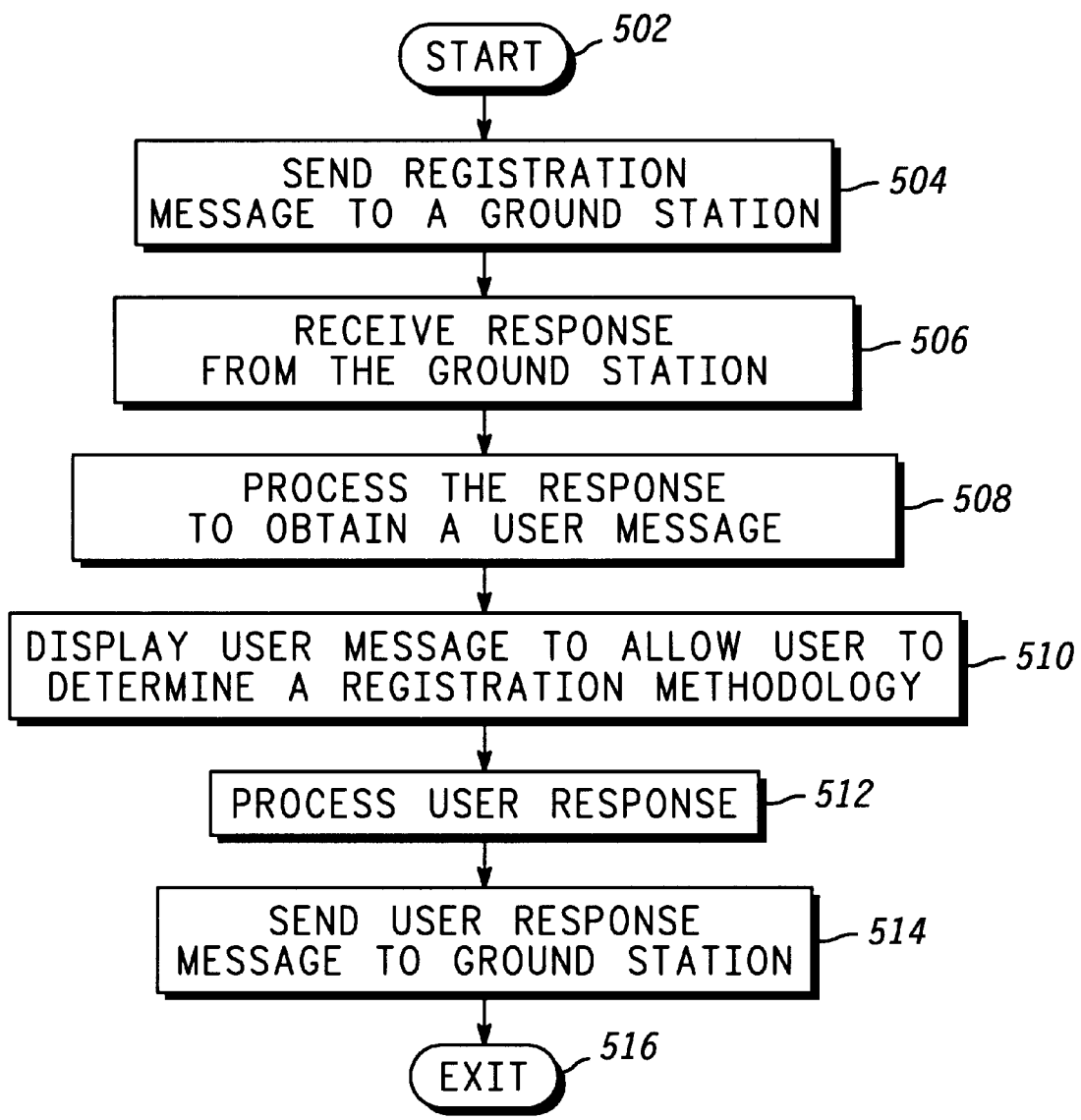
FIG. 5 illustrates a flow chart of a method for operating a subscriber unit in accordance with a preferred embodiment of the invention.

FIG. 5 illustrates a flow chart of a method for operating a subscriber unit in accordance with a preferred embodiment of the invention. Procedure 500, which starts with step 502, is applicable to the operation of a SU adapted to perform at l(east one user-aided registration procedure.

In step 504, a registration request is sent by the SU to a ground station. In a preferred embodiment, the registration request is sent because a user has requested a manual registration.

In a preferred embodiment, a manual registration function is provided on the SU. Desirably, this is accomplished using a dedicated key. However, this is not required for the invention. In alternate embodiments, a multifunction key or other user input device, such as a touch-screen, can be used.

In step 506, the SU receives a registration response. In a preferred embodiment, the registration response is received from a ground station. Desirably, the ground station is a gateway responsible for the region in which the SU is currently located.

In step 508, the SU unit processes the registration response to obtain a user message. The user message allows a user to aid the registration process. Desirably, a user accepts registration in the identified region by sending a response message to the ground station. In alternate embodiments, a ground station could use a non-response within a given length of time as an acceptance. In other embodiments, a user could have other choices. For example, a user could reject a first registration region and request a second choice. Primary and secondary choices could be presented as lists.

In a preferred embodiment, a SU has at least one level of service associated with it. The level of service is used, among other things, to determine what is presented to the user during the user-aided registration procedure. For example, one level of service could allow a user to register in only one region. In this case, the amount of data stored in the SU is minimized, and a user-aided registration allows a user to accept or reject being registered in one region. The level of service can also be used to limit the number of times a SU can initiate a user-aided registration. In addition, a second level of service could be used to allow a SU more than one choice in determining which registration region to use. Also, a third level of service could be used to allow a SU to force registration to occur in a particular region.

In step 510, the SU presents the user message. In a preferred embodiment, the user message is displayed using an alphanumeric display on the SU. In alternate embodiments, auditory devices can also be used to present the message to the user and/or alert the user. In other embodiments, SUs can display messages using non-ASCII strings. In other embodiments, additional information is displayed with the registration region information. For example, cost information could be displayed during user-aided registration procedures.

In step 512, the SU processes a response from the user. In a preferred embodiment, if a user response is not processed within a first amount of time, then the SU continues to step 516, and procedure 500 ends.

In step 514, a user response message is sent by the SU. In a preferred embodiment, the user response message is sent by the SU to the ground station that received the SU's registration request. In alternate embodiments, a registration procedure could be performed using a SU and a satellite or other communications platform. In step 516, procedure 500 ends.

Figure 6:
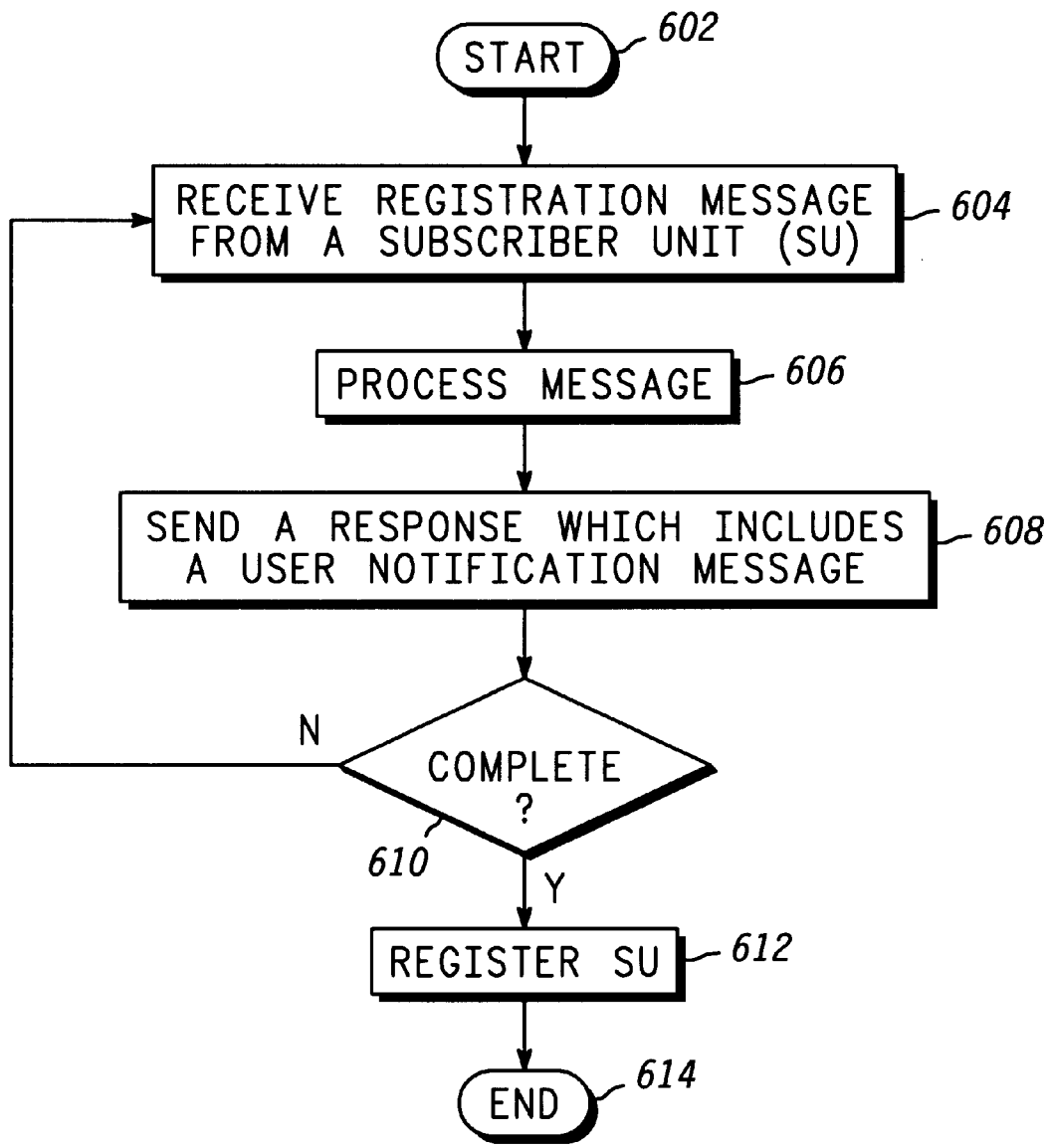
FIG. 6 illustrates a flow chart of a method for operating a ground station in accordance with a preferred embodiment of the invention.

FIG. 6 illustrates a flow chart of a method for operating a ground station in accordance with a preferred embodiment of the invention. Procedure 600, which starts with step 602, is applicable to the operation of a ground station adapted to perform at least one user-aided registration procedure.

In step 604, the ground station receives a user-aided registration message from a SU. In a preferred embodiment, the user-aided registration message can comprise requests and/or responses from at least one SU that is adapted to perform a user-aided registration procedure, such as described in FIG. 5.

In a preferred embodiment, the communications system cannot always detect border crossings that occur when a SU is moved from one geo-political region to another geopolitical region. The SU user can request a user-aided registration procedure when he/she crosses or approaches a border.

In alternate embodiments, a SU user can request a user-aided registration procedure to lower costs. In addition, a SU user can request a user-aided registration procedure to move to a less restrictive registration region.

In step 606, a ground station processes the received message and determines if the message comprises a request or a response.

In a preferred embodiment, when the ground station receives a registration request, the ground station determines a location for the SU. Desirably, the communications system locates the SU after moving the SU on to a traffic channel. In alternate embodiments, location information can be included along with a registration request. In other embodiments, control channels and/or acquisition channels could be used to send location information.

In a preferred embodiment, location information is obtained from the SU because the SU includes, among other things, a geolocation device. Desirably, the geolocation device determines location based on information obtained from a Global Positioning System, such as GPS. In alternate embodiments, a crude location estimate can be determined using Doppler information, time delay information, satellite position information, and beam information.

In a preferred embodiment, when the ground station has established a current location for the SU, the ground station determines a code that is associated with the current location for the SU. Desirably, the code is used to determine an ASCII string containing a general description of the user's current position and identifies the registration region in which the SU is to be registered.

In a preferred embodiment, when the ground station receives a registration response from a SU, the ground station identifies the SU. Desirably, the user-aided registration message comprises a user response message. The user response message can be a request for additional information, such as other registration regions.

In step 608, the ground station sends a response message that comprises at least one user notification message. The user notification message includes, among other things, the ASCII string containing the general description of the user's current position and registration region.

In step 610, a query is performed to determine when the user-aided portion of the registration procedure has been completed (i.e., the registration region has been determined). When the user-aided portion of procedure 600 has not been completed, then procedure 600 branches back to step 604 and iterates as shown in FIG. 6. When the user-aided portion of the procedure has been completed, then procedure 600 continues with step 612.

In step 612, the registration process is completed for the SU, when the user-aided portion has been successfully completed. Procedure 600 ends in step 614.

In a preferred embodiment, steps 604–610 are performed a number of times. Steps 604–610 are performed each time a SU interacts with a ground station during a user-aided registration. For example, a ground station could receive a second user-aided registration message. This could occur if a user did not like the first registration region that was presented and asked for a second choice. In this case, a second response could be sent to the SU, and the second response message could comprise a second user notification message.

Those skilled in the art will recognize that the steps described above do not need to be performed in the sequence listed above. The sequence is not important to the nature of the present invention. Those skilled in the art will also recognize that some SUs will require different tasks to be performed at different times.

The method and apparatus of the present invention provides a means for allowing user-aided registration in a satellite communications system. This reduces the amount of border information that is stored by a communications system. While the principles of the invention have been described above in connection with specific apparatus, it is to be clearly understood that this description is made only by way of example and not as a limitation on the scope of the invention.

What is claimed is:

1. A method for providing user-aided registration to a subscriber unit (SU) in a satellite communications system having a plurality of communications satellites, and at least one ground station, said SU communicating with said at least one ground station using at least one of said plurality of communications satellites, said method comprising the steps of:
   a) receiving, at said at least one ground station, a registration request from said SU;
   b) processing said registration request at said at least one ground station;
   c) sending a response message to said SU, said response message comprising a first registration region;
   d) processing said response message at said SU to determine a display message, said display message identifying said first registration region;
   e) displaying said display message at said SU to a user;
   f) processing a first user response to said display message at said SU;
   g) sending a first user response message to said at least one ground station; and
   h) processing said first user response message at said at least one ground station.

2. The method as claimed in claim 1, wherein said method further comprises the steps of:
   i) sending a second response message to said SU, said second response message comprising a second registration region;
   j) processing said second response message at said SU to determine said second registration region;
   k) displaying said second registration region at said SU;
   l) processing a second user response at said SU;
   m) sending a second user response message to said at least one ground station; and
   n) processing said second user response message at said at least one ground station.

3. The method as claimed in claim 1, wherein step b) further comprises the steps of:
   b1) determining a location for said SU from said registration request; and
   b2) determining said first registration region using said location.

4. The method as claimed in claim 1, wherein step c) further comprises the step of:
   c1) including a list of registration regions in said response message, said list comprising said first registration region and at least one other registration region.

5. The method as claimed in claim 1, wherein step c) further comprises the step of:
   c1) associating a pointer with said first registration region and sending said pointer in said response message.

6. The method as claimed in claim 1, wherein step d) further comprises the steps of:
   d1) obtaining a list of registration regions from said response message, said list comprising said first registration region and at least one other registration region; and
   d2) determining said display message, said display message identifying said first registration region and at least one other registration region.

7. The method as claimed in claim 1, wherein step d) further comprises the steps of:
   d1) obtaining a pointer from said response message, said pointer identifying said first registration region; and
   d2) determining said display message using said pointer, said display message identifying said first registration region.

8. The method as claimed in claim 1, wherein step e) further comprises the step of:
   e1) using an auditory device to present a first portion of said display message to said user.

9. In a communications system having a plurality of communications satellites and a plurality of subscriber units (SUs) adapted to perform user-aided registration procedures, a ground station for performing user-aided registrations, said ground station comprising:
   at least one antenna for establishing a communications link with at least one of said plurality of communications satellites;
   at least one radio frequency (RF) transceiver coupled to said at least one antenna, said at least one RF transceiver processing RF signals used to send and receive message data via said communications link, receiving at least one user-aided registration request message from at least one of said plurality of SUs, sending at least one response message, receiving at least one user response message from at least one of said plurality of SUs;
   a controller coupled to said at least one RF transceiver for processing said message data, said controller processing said at least one user-aided registration request message to determine a location for said at least one of said plurality of SUs, determining a registration region for said at least one of said plurality of SUs, including said registration region in a response message, and causing said at least one RF transceiver to send said response message to said at least one of said plurality of SUs, processing a user response message for registering said at least one of said plurality of SUs in said registration region when said user response message indicates said registration region is accepted by a user of said at least one of said plurality of SUs, and not registering said at least one of said plurality of SUs in said registration region when said user response message indicates said registration region is rejected by a user of said at least one of said plurality of SUs;
   a memory for storing said message data; and
   at least one terrestrial network interface coupled to said controller for exchanging data with at least one other system.

10. The ground station as claimed in claim 9, wherein said memory further comprises:
    at least one database containing records that are used to described borders for a number of geo-political regions.

11. The ground station as claimed in claim 9, wherein said memory further comprises:
    at least one database containing at least one ASCII string identifying each registration region.

12. The ground station as claimed in claim 9, wherein said controller is further for including a list of registration regions in a response message.

13. The ground station as claimed in claim 9, wherein said controller is further for processing another response message comprising at least one other registration region, and causing said at least one RF transceiver to send said another response message to said at least one of said plurality of SUs.

14. The ground station as claimed in claim 13, wherein said controller is further for processing another user response message, for registering said at least one of said plurality of SUs in said registration region when said another user response message indicates said registration region is accepted by said at least one of said plurality of SUs, and not registering said at least one of said plurality of SUs in said registration region when said another user response message indicates said registration region is rejected by said at least one of said plurality of SUs.

15. In a communications system having a plurality of communications satellites and at least one ground station adapted to perform user-aided registration procedures, a subscriber unit for performing user-aided registrations, said subscriber unit comprising:

at least one radio frequency (RF) transceiver, said RF transceiver processing RF signals that are sent to and received from said at least one ground station using a communications link with at least one of said plurality of communications satellites, sending at least one registration request to said at least one ground station, sending at least one user response message, and receiving at least one response message from said at least one ground station;

a device for determining a location for said subscriber unit;

a controller coupled to said at least one RF transceiver and to said device;

a memory coupled to said controller for storing information that is manipulated during user-aided registration procedures; and a user interface coupled to said controller for receiving user input and for presenting display messages, said controller processing said at least one registration request, processing said at least one response message to determine a registration region, using said user interface to present said registration region in one of said display messages, processing said display messages, processing a user response to said registration region from said user input, processing said at least one user response message.

16. The subscriber unit as claimed in claim 15, wherein said at least one RF transceiver is further for sending a user response message to said at least one ground station accepting said registration region.

17. The subscriber unit as claimed in claim 16, wherein said at least one RF transceiver is further for sending a user response message to said at least one ground station rejecting said registration region.

* * * * *